No. 651,842. Patented June 19, 1900.
J. T. FORD.
FRICTION CLUTCH.
(Application filed Aug. 18, 1899.)

(No Model.) 3 Sheets—Sheet 2.

Witnesses:
D. W. Edelin.
E. M. Young.

Inventor:
James T. Ford
By his attys

No. 651,842.

J. T. FORD.
FRICTION CLUTCH.
(Application filed Aug. 18, 1899.)

(No Model.)

Patented June 19, 1900.

3 Sheets—Sheet 3.

Witnesses:
D. W. Edelin
E. M. Young.

Inventor:
James T. Ford
By his attys
Bunie & Goldsborough

UNITED STATES PATENT OFFICE.

JAMES THOMAS FORD, OF GALVESTON, TEXAS.

FRICTION-CLUTCH.

SPECIFICATION forming part of Letters Patent No. 651,842, dated June 19, 1900.

Application filed August 18, 1899. Serial No. 727,694. (No model.)

*To all whom it may concern:*

Be it known that I, JAMES THOMAS FORD, a citizen of the United States, residing in Galveston, in the county of Galveston, State of Texas, have invented certain new and useful Improvements in Friction-Clutches; and I do hereby declare the following to be a full, clear, and exact description of the invention, such as will enable others skilled in the art to which it appertains to make and use the same.

My invention relates to clutches, and more particularly to that type wherein the members composing the clutch are adapted to transmit motion from one to the other by frictional engagement thereof. In clutches of this general character it is desirable that the means for controlling the frictional engagement of the members shall be of simplified construction, powerful in operation, and readily controllable to tighten or release the engagement of the clutch members without stopping the machine.

With these objects in view my invention consists of the parts and combinations, as will hereinafter clearly appear and be definitely pointed out in the claims.

Figure 1:
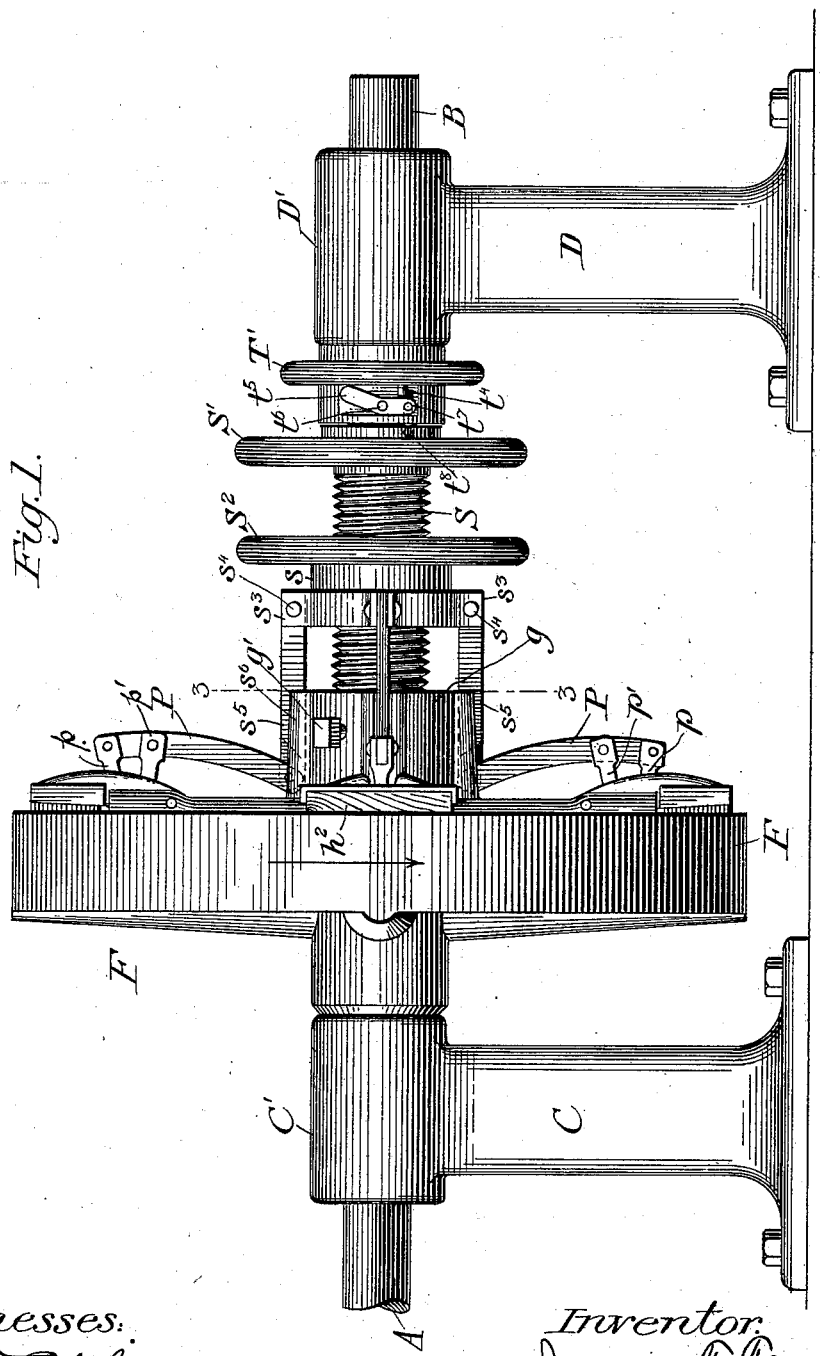
Figure 2:
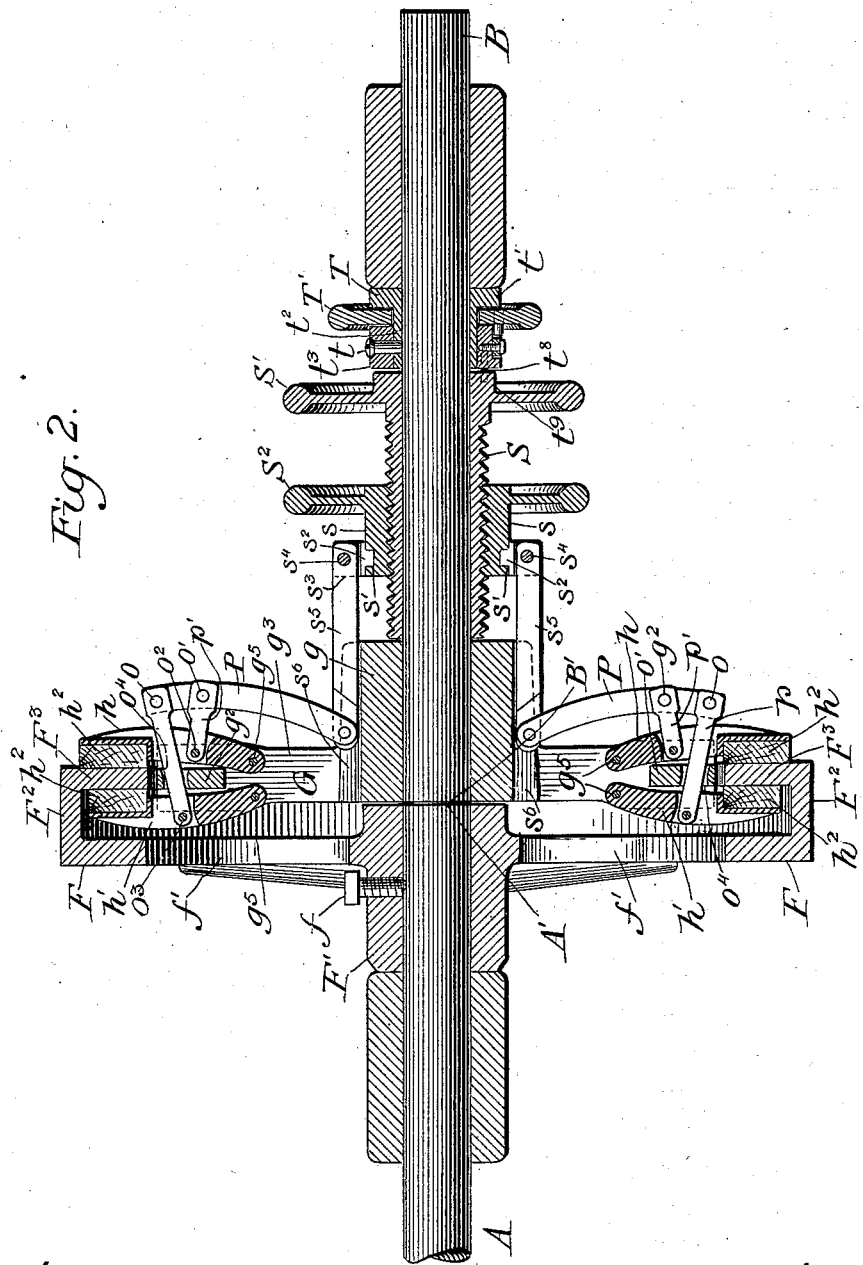
Figure 3:
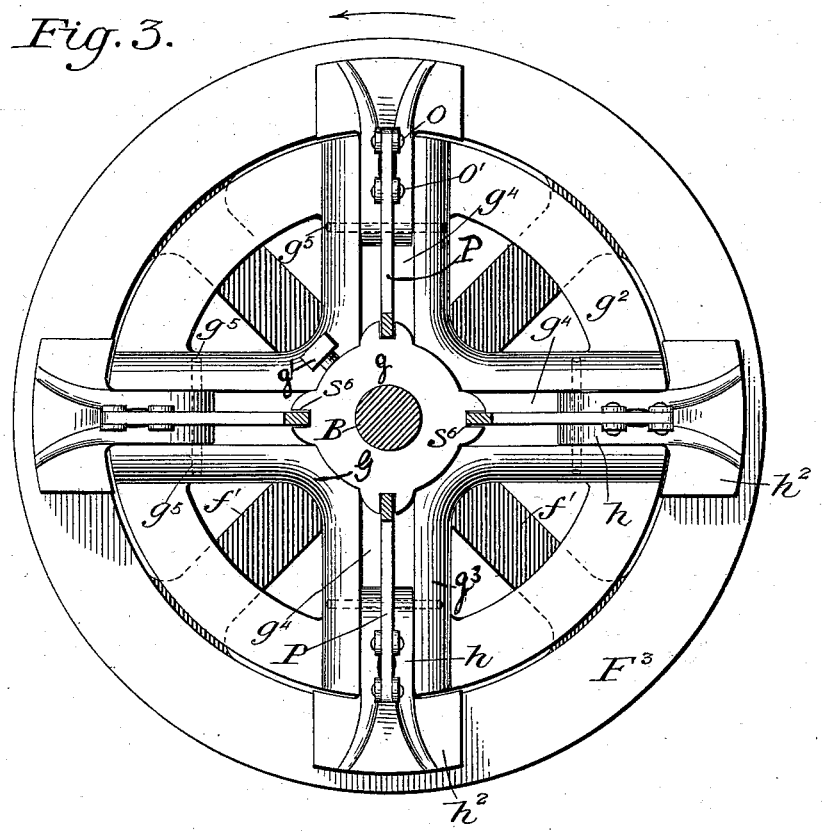

Having reference to the drawings, Figure 1 shows my improved clutch in side elevation. Fig. 2 is a longitudinal section thereof, and Fig. 3 is a section on line 3 3, Fig. 1.

Supported in any usual manner and connected to any desired driving and driven parts of a machine, respectively, are the alined shafts A B, having their ends A' B' in close proximity. These shafts, as shown in the drawings, are supported on uprights C D, provided with any usual form of journal-bearings C' D'. It is to be noted, however, that such uprights and bearings are shown in this connection simply as an illustration of any known supporting means for the two shafts A B and such supporting means need not be located in relation to the parts as shown, it being necessary only that the two shafts extending from the driving and driven parts of a machine shall be suitably held in alinement.

Mounted on and secured to the shaft A, which may for the purposes of this description be designated the "power-transmitting" shaft, although either shaft A or B can be used for this purpose, is a friction grip-wheel F, carried by the hub F', fixed to said shaft A by means of the binding-screw $f$. Extending radially from the hub F' and preferably formed integral therewith are the arms $f'$, carrying at their outer ends the flanged rim $F^2$, having the inturned friction-rim $F^3$, which by its opposite faces forms the friction-surface of the grip-wheel F.

Near the end of shaft B, adjacent the grip-wheel F, is the skeleton wheel G, appropriately secured to said shaft in any convenient manner, as by the set-screw $g'$, passing through the hub $g$ and bearing forcibly against the shaft. The skeleton wheel G is preferably formed of less diameter than the grip-wheel and its radiating arms $g^3$ carry near their outer end the ring $g^2$, which is preferably formed to loosely fit within the friction-rim $F^3$, as clearly indicated in Figs. 2 and 3. The radiating arms $g^3$ of the skeleton wheel G are preferably formed with slots $g^4$, extending from the hub $g$ to the ends of the arms, and in the recess thus formed there is pivoted to each arm on pins $g^5$ a pair of friction-shoe-supporting arms $h$ $h'$, each carrying at its outer end a friction-shoe $h^2$. These friction-shoes bear upon the opposite faces of the friction-rim $F^3$, as will be clear from Fig. 2, and their frictional contact therewith is controlled by the following mechanism:

Loosely mounted on the shaft B is the externally-threaded sleeve S, operative by the hand-wheel S', and mounted to turn on said sleeve is the hand-wheel $S^2$, having an extended hub provided with an internal screw-thread corresponding to and in engagement with the external threads of sleeve S. The hub $s$ is also provided with an annular groove or recess $s'$, in which freely rides a collar $s^2$, having lugs $s^3$ projecting radially therefrom at intervals around its periphery. Pivoted to said lugs $s^3$ by pins $s^4$ are the connecting-arms $s^5$, extending toward and riding in grooves $s^6$ on the hub $g$ of the skeleton wheel G. To the ends of the arms $s^5$ are pivotally connected the levers P, corresponding in number to the said arms and extending radially with and opposite the slots $g^4$ in the radial arms $g^3$ of the skeleton wheel G. The levers P at their extreme outer ends are pivotally connected at $o$ to the links $p$, which extend through slots $o^4$ in the rim $g^2$ of the skeleton wheel and are pivotally attached to the inner shoe-supporting arms $h'$ above the pivotal connections $g^5$ with the radial arms $g^3$ of the skeleton wheel. At a point a short distance from the ends of levers P the links $p'$ have pivotal connection with said levers at $o'$ and from thence extend toward and are pivoted at $o^2$ to the outer shoe-supporting arms $h$. Thus it will be seen that a movement of the arms $s^5$ longitudinally of the shaft B will cause the levers P to move the shoe-supporting arms upon their pivotal connection with the radial arms $g^3$ and cause their shoe-supporting ends to move toward or from each other to thereby clamp the friction-rim $F^3$ between them or release it from frictional engagement therewith. In this movement of the levers P the link connections $p$ or $p'$ act as fulcrums about which the levers turn, and hence positive and certain action either in clamping or unclamping the shoes is secured.

Fixed to the shaft B by any suitable means, as the set-screw $t$, is a collar T, having a flange $t'$ and a reduced extension $t^2$, on which and between the flange $t'$ and a ring $t^3$, fixed to the extension, there freely turns a lock-wheel T', carrying a pin $t^4$. Pivotally secured at $t^6$ in a recess on the ring $t^3$ is the bent latch $t^5$, provided at its end $t^7$ with a pin $t^8$, adapted to be retracted and projected from the face of the ring on movement of the bent latch. By turning the lock-wheel T' the pin $t^4$ rides along the bent edge of the latch $t^5$, turning it on its pivot to project or retract the pin $t^8$. In the face of the threaded sleeve S a hole or recess $t^9$ is provided to be engaged by the pin $t^8$ when projected to lock the said sleeve to the collar T to prevent relative rotation thereof with the shaft B; but when said pin $t^9$ is retracted the threaded sleeve S is free to rotate on the shaft B. The threaded sleeve S is confined on the shaft B between the hub $g$ of skeleton wheel G and the collar T, these parts being fixed to the shaft as thrust-bearings for the threaded sleeve.

From the foregoing it will be evident that movement of the arms $s^5$, and consequently the shoes $h^2$, to clamp or unclamp the friction-rim $F^3$ is secured by a relative movement between the externally-threaded sleeve S and the wheel $S^2$, having the internally-threaded hub. Such relative movement can be given these parts either by turning the hand-wheel $S^2$ when the threaded sleeve is locked to the collar T or when the sleeve is unlocked by turning the hand-wheel S', the hand-wheel $S^2$ being held stationary. The direction of turning wheels S' and $S^2$ to effect the same movement of the friction-shoes is in reverse directions—that is, if hand-wheel $S^2$ is turned, say, in the direction of the hands of a clock, as in Fig. 1, it will clamp the friction-shoes upon the friction-rim, whereas to so clamp the friction-shoes by the hand-wheel S' requires a reverse rotation of said wheel.

Assuming the parts to be in the relative position shown by Figs. 1 and 2, with the threaded sleeve locked to the collar T, which is the position they occupy when the friction-shoes are in engagement with the friction-rim, to frictionally engage the members of the clutch and assume the grip-wheel F and connected parts to be rotating in the direction of the arrows, Figs. 1 and 3, should it become necessary or desirable to increase the frictional engagement of the shoes with the friction-rim, as where heavier work is to be done, it is only necessary to offer a slight resistance to the turning of the hand-wheel $S^2$, whereupon it will have relative movement to the threaded sleeve in the appropriate direction to move the arms $s^5$ to the left and tighten the engagement of the shoes. When it is desired to unclamp the shoes from the friction-rim, however, the lock-wheel T' is first impeded in its rotation with shaft B, whereupon the pin $t^8$ is retracted by the swinging of the bent latch $t^5$, freeing the threaded sleeve S from connection with shaft B, and opposition to the further rotation of the sleeve S through hand-wheel S' moves the wheel $S^2$ and its threaded hub to the right and releases the friction-rim from the shoes, as will be fully apparent.

It will thus be seen that while my device is simple and efficient in construction it can be operated at will to increase the frictional energy between the clutch members without stopping the machine, and the parts are easily and readily thrown out of engagement.

Having thus described my invention, what I claim, and desire to secure by Letters Patent, is—

1. In a friction-clutch, the combination of a friction grip-wheel, friction-shoes and means for operating the shoes to engage or disengage the friction grip-wheel, comprising a shaft, a threaded sleeve loosely mounted on the shaft and provided with a hand-wheel, means for preventing endwise movement of the sleeve on the shaft, a threaded hub in engagement with the threaded sleeve, means to lock and unlock the sleeve to the shaft, and connections between the threaded hub and friction-shoes.

2. In a friction-clutch, the combination of a friction grip-wheel, friction-shoes and means for operating the shoes to engage and disengage the friction grip-wheel, comprising a shaft, a threaded sleeve loosely mounted on the shaft and provided with a hand-wheel, a threaded hub mounted on and in engagement with the threaded sleeve, a collar fixed to the shaft, means to lock and unlock the collar to the threaded sleeve, and connections between the hub and friction-shoes.

3. In a friction-clutch, the combination of a friction grip-wheel, friction-shoes and means to cause said shoes to engage and disengage the friction-wheel comprising a shaft, an exteriorly-threaded sleeve loosely mounted on the shaft, means to prevent longitudinal movement of the sleeve on the shaft, an interiorly-threaded hub mounted on the sleeve, a lock to connect the sleeve to the shaft, means to disengage the lock from the sleeve during rotation of the shaft, and connections between the hub and shoes.

4. In a friction-clutch, the combination of the clutch members, the shaft, an exteriorly-threaded sleeve loosely mounted on the shaft but held from endwise movement thereon, a collar fixed to the shaft, a hand-wheel loosely mounted on the collar, means operative by said hand-wheel to lock and unlock the threaded sleeve to the shaft, a threaded hub mounted on said sleeve, and means operative by endwise movement of the hub to engage and disengage the clutch members.

5. In a friction-clutch, the combination of a shaft, a friction grip-wheel mounted thereon, a skeleton wheel provided with a grooved hub and carrying pivoted friction-shoe-supporting arms, a connecting-arm movable longitudinally of the shaft in the grooves of said hub, a lever pivoted to the end of the connecting-arm, and links joining the friction-shoe-supporting arms with said lever at different distances from its end.

6. In a friction-clutch, the combination of a shaft, a friction grip-wheel mounted thereon, a skeleton wheel provided with a grooved hub and carrying pivoted friction-shoe-supporting arms, a threaded sleeve mounted on said shaft, an interiorly-threaded hub mounted on said sleeve, connecting-arms secured to said hub and movable in the grooved hub, levers connected to said connecting-arms, and links joining the friction-shoe-supporting arms to said levers at different distances from the ends of the latter.

In testimony whereof I affix my signature in presence of two witnesses.

JAMES THOMAS FORD.

Witnesses:
 JESSE ALBERT BELCHER,
 HARRY SMITH.